Feb. 20, 1923.

B. C. COONS.
PARING MACHINE.
FILED JULY 17, 1919.

INVENTOR.
Burton C. Coons
BY Davis & Simms
his ATTORNEYS.

Feb. 20, 1923.
B. C. COONS.
PARING MACHINE.
FILED JULY 17, 1919.
1,445,997.
8 SHEETS—SHEET 2.
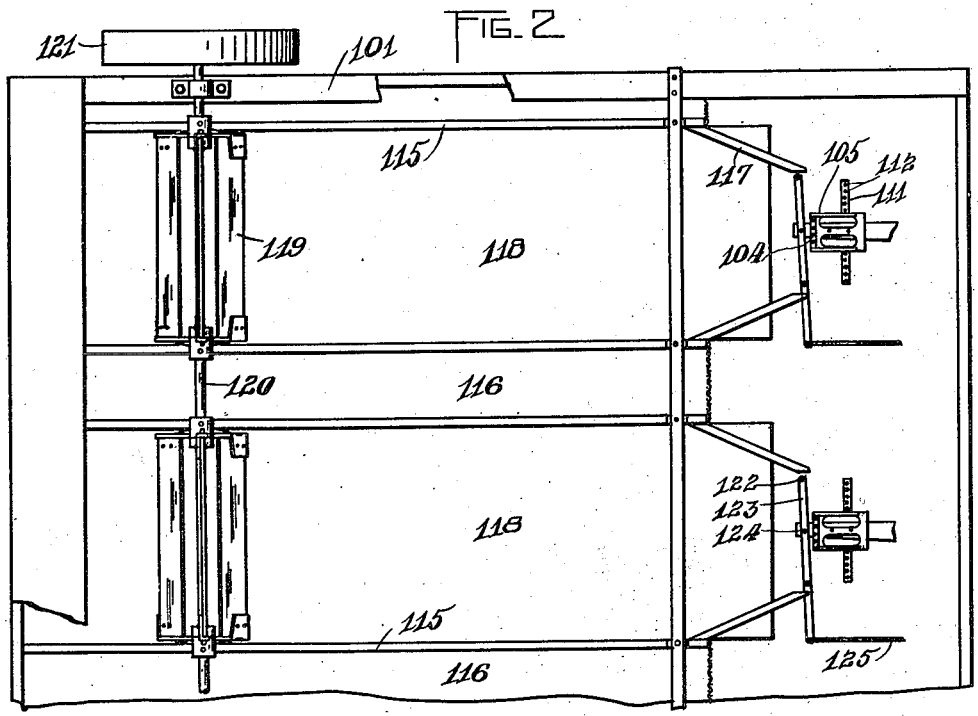
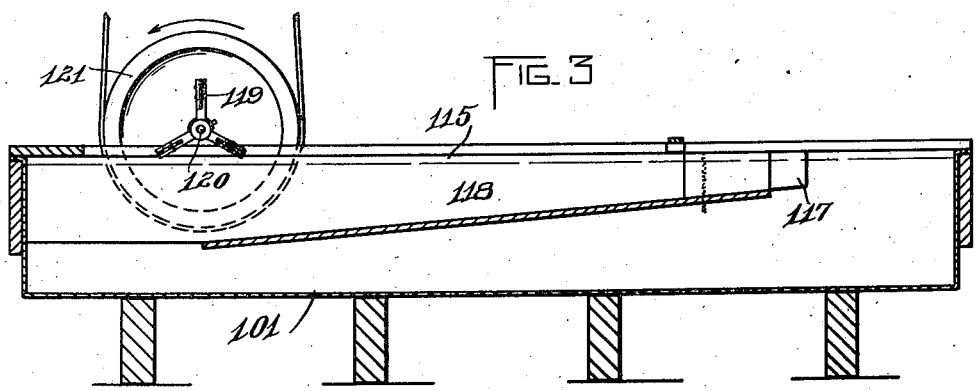
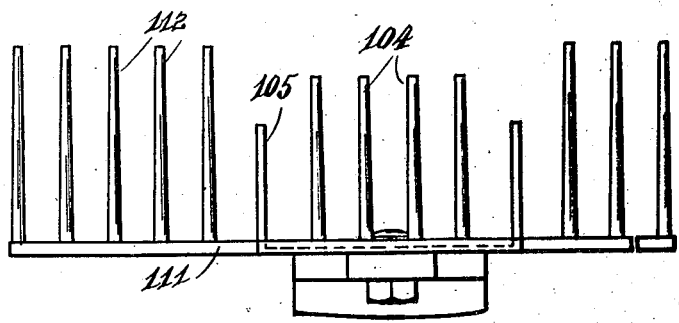
INVENTOR
Burton C. Coons
BY
Davis & Simms
his ATTORNEY

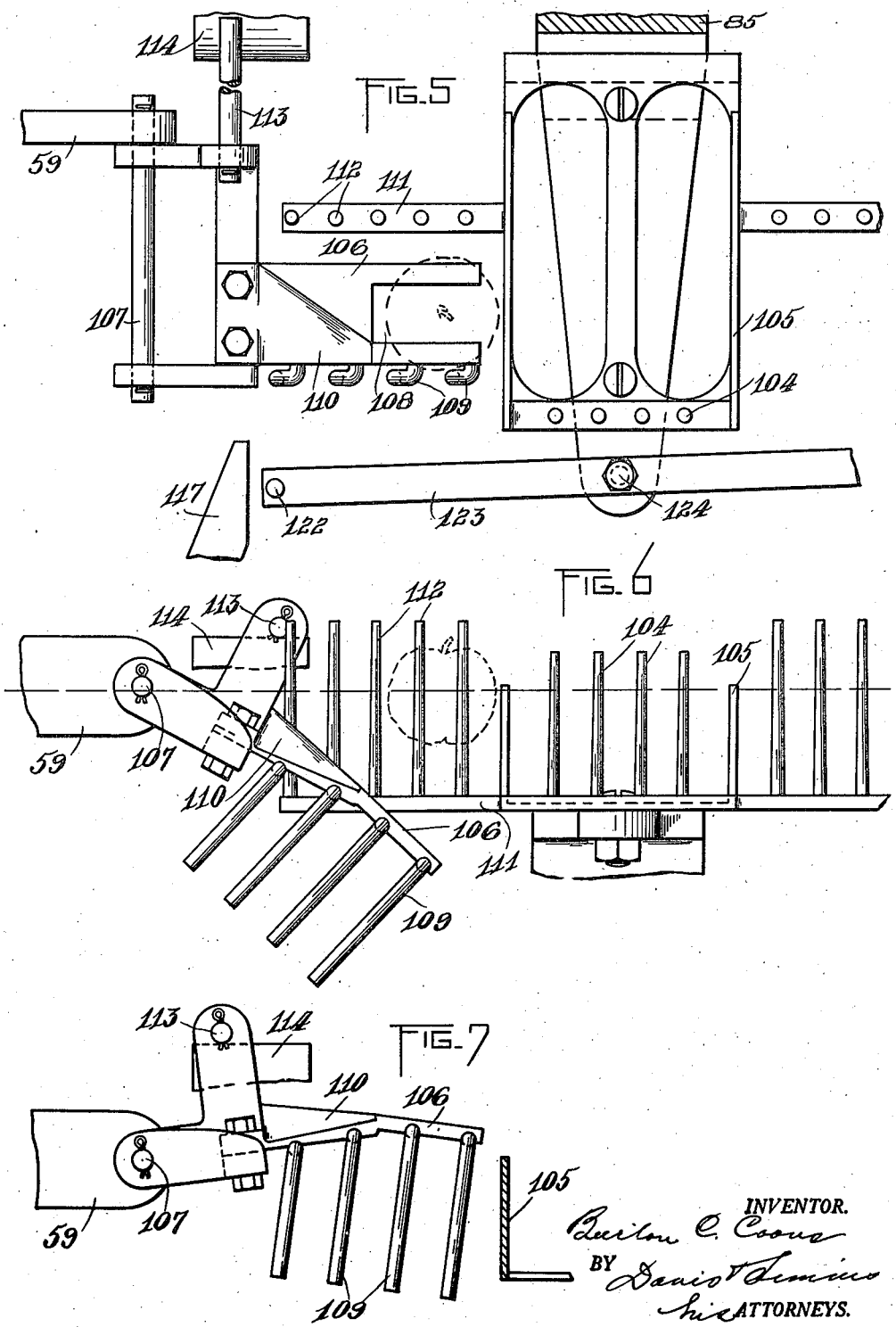

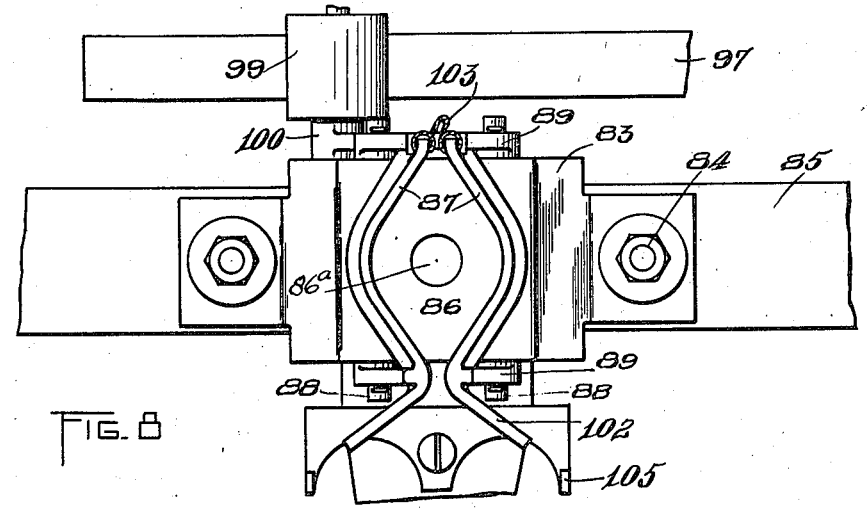
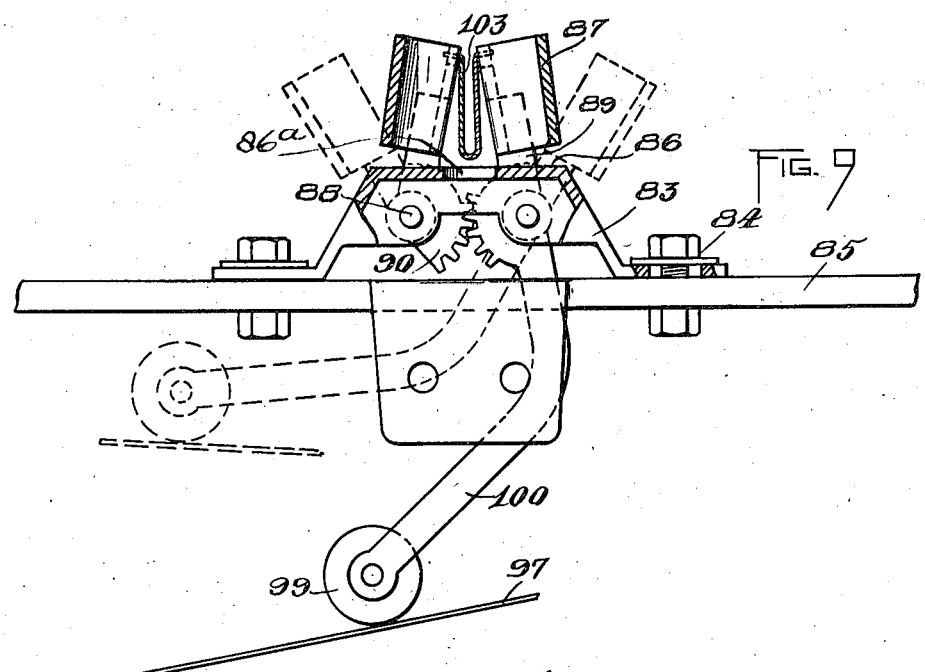
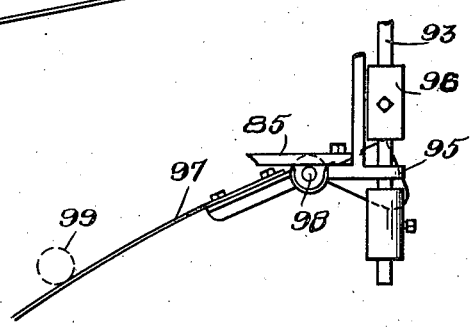

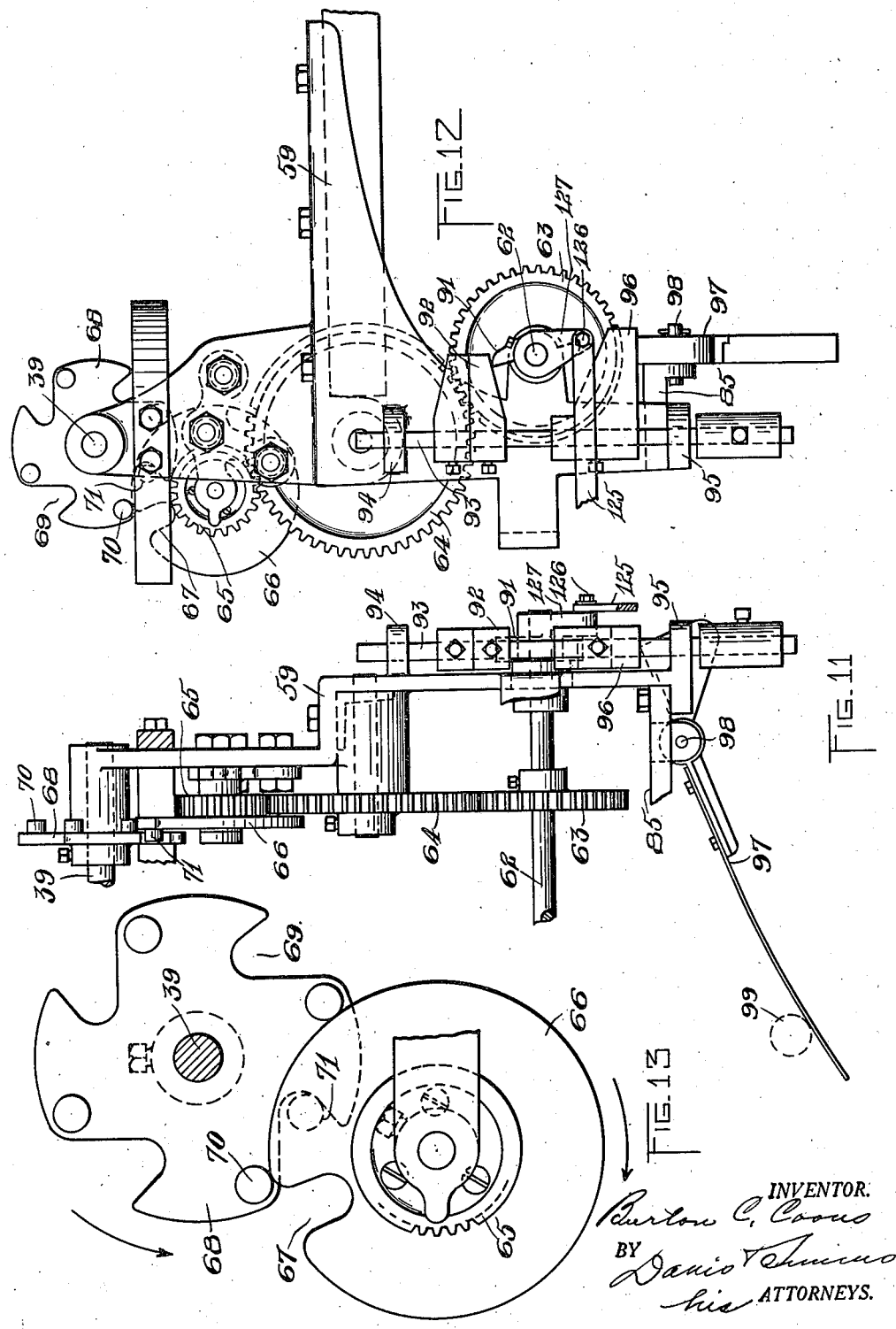

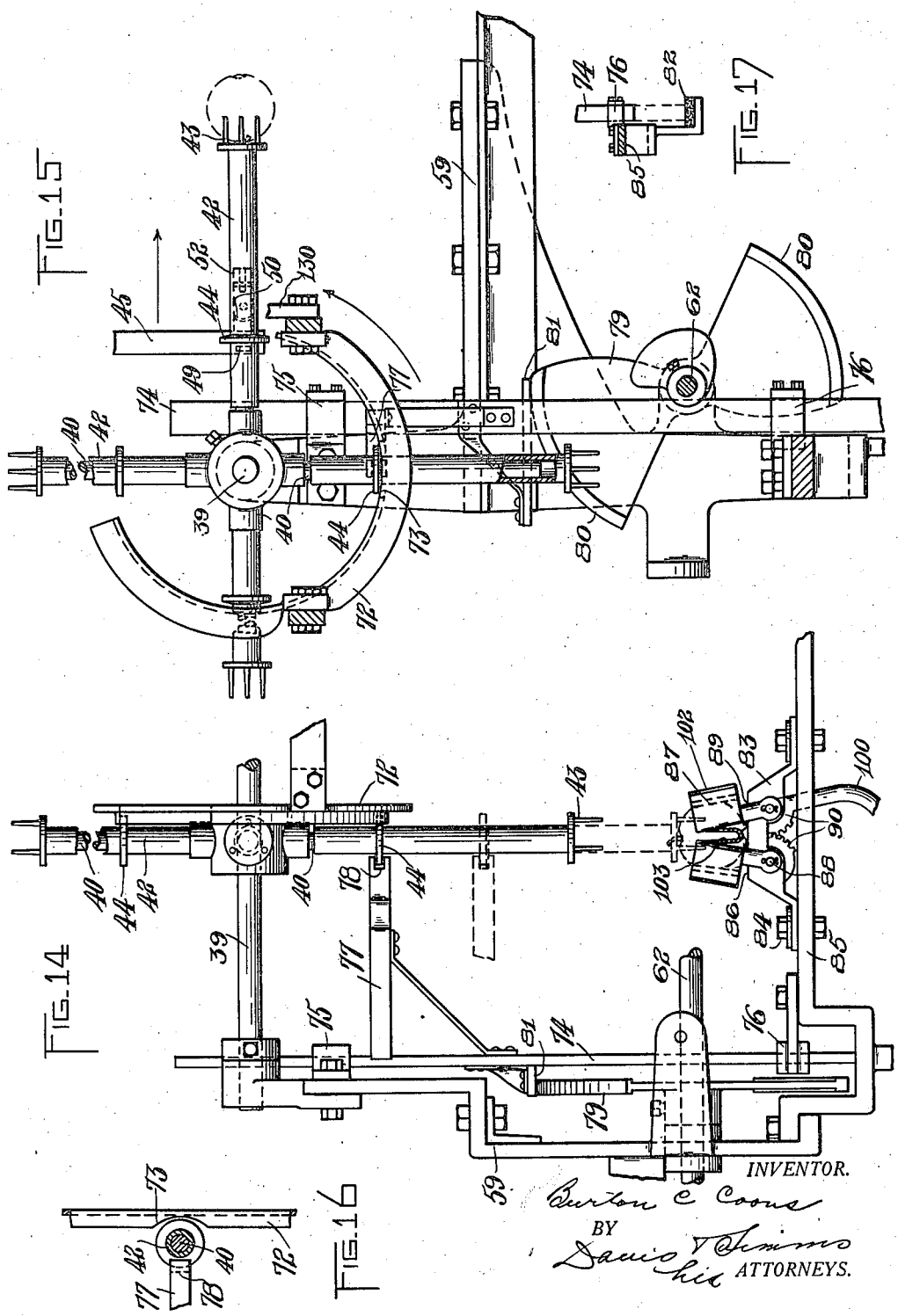

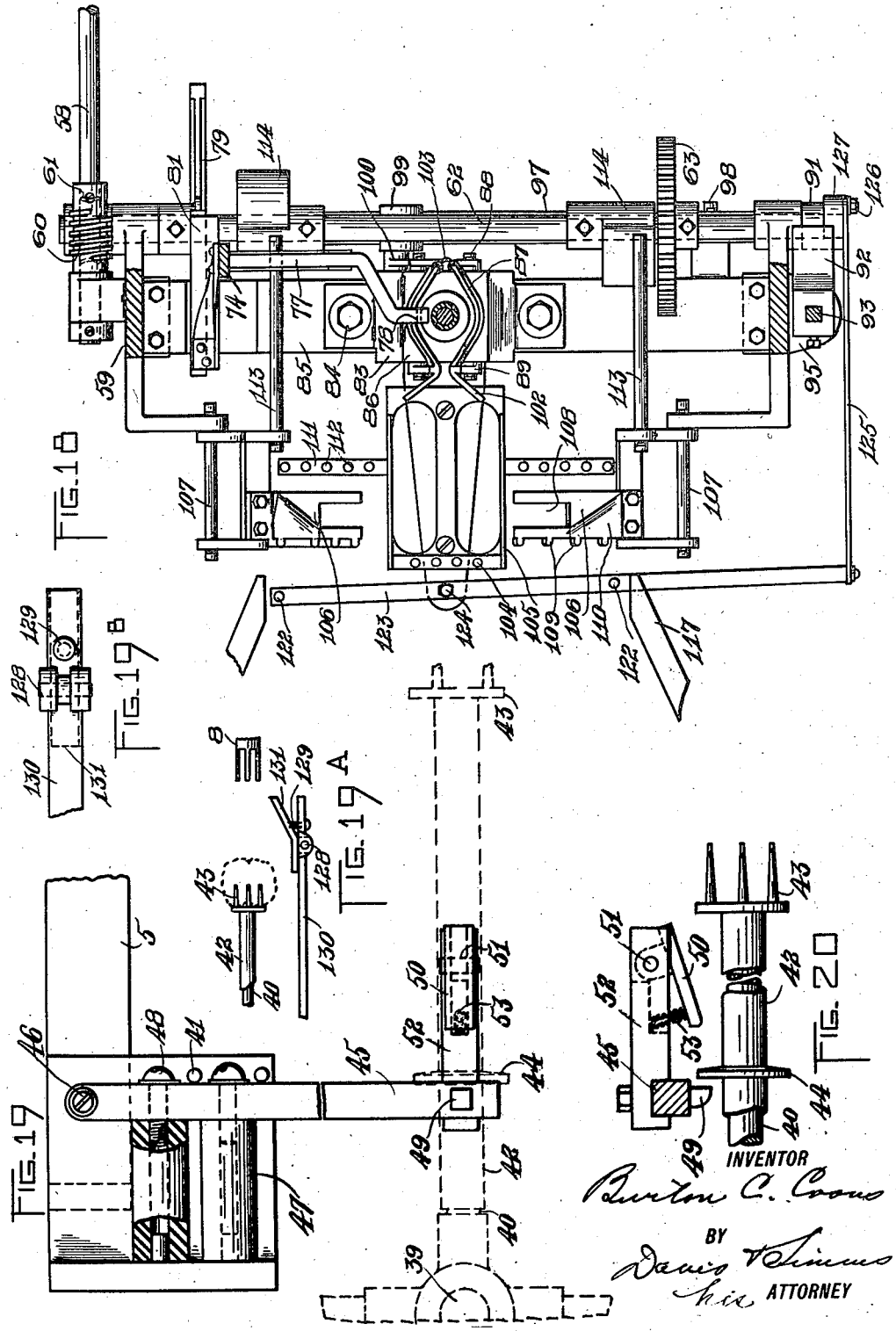

Feb. 20, 1923.
B. C. COONS.
PARING MACHINE.
FILED JULY 17, 1919.
1,445,997.
8 SHEETS—SHEET 8.
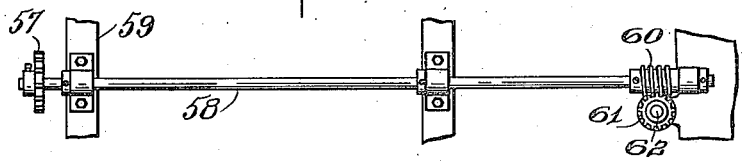
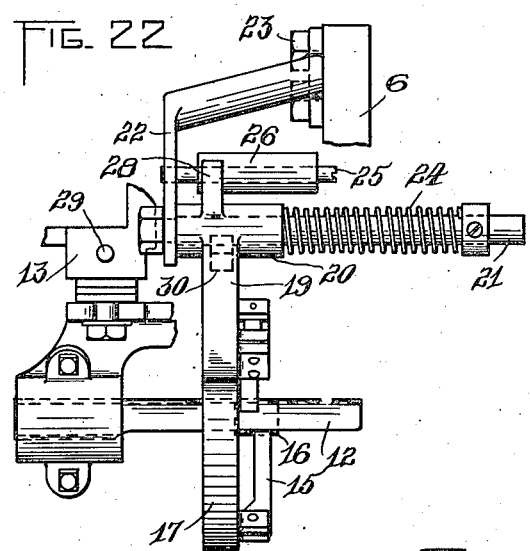
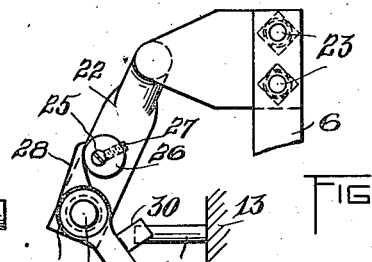
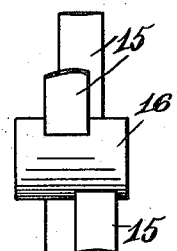
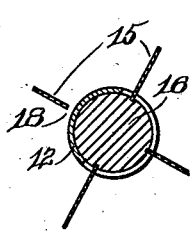
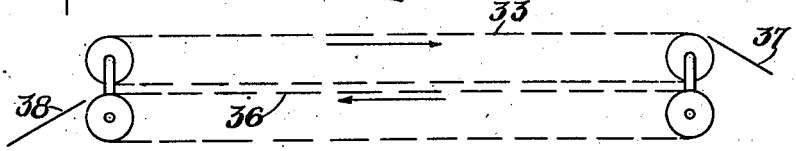
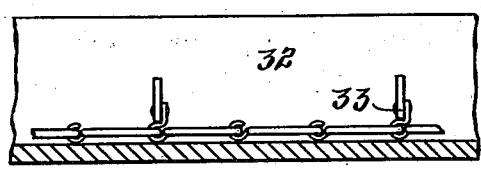

Patented Feb. 20, 1923.

1,445,997

UNITED STATES PATENT OFFICE.

BURTON C. COONS, OF ROCHESTER, NEW YORK.

PARING MACHINE.

Application filed July 17, 1919. Serial No. 311,397.

*To all whom it may concern:*

Be it known that I, BURTON C. COONS, a citizen of the United States, and resident of Rochester, in the county of Monroe and State of New York, have invented certain new and useful Improvements in Paring Machines, of which the following is a specification.

The present invention relates to paring machines and more particularly to the type in which the article to be pared is supported upon a device preferably in the form of a rotary fork and is operated upon while so supported by a paring knife, an object of this invention being to provide an improved dividing mechanism which will divide the article into a number of parts after such article has been pared. Another object of the invention is to provide a dividing mechanism to which the pared article is moved by a push off mechanism after the paring operation ceases. Another object of the invention is to provide a dividing mechanism which will operate in connection with a push off mechanism and a coring mechanism to divide the article into a number of parts after the coring and the paring of the article has taken place. Still another object of the invention is to provide a feeding mechanism in the form of a carrier rotatable about a horizontal axis and receiving the fruit from a position below the axis of the carrier to transfer the same to a horizontally positioned fork on which the paring takes place. Still another object of the invention is to provide a transfer mechanism having an article holding device thereon which is adapted to be brought from a receiving position to a position in alignment with the fork on which the paring takes place, said article holding device preferably being operated through the carriage which operates the paring mechanism, a yielding means being provided in said operating means to permit the apparatus to accommodate articles of different sizes. Still another object of the invention is to provide a transfer mechanism which will remove an article from a centering means and transfer it to a centered position on a fork or supporting device on which the article is pared. Still another object of the invention is to provide a centering means for apples or the like in which the apples are seized and centered while they are floating in water, a transfer means being provided to remove the centered apples from the centering means and transfer them to a position where they may be pared. Still another object of the invention is to provide a centering means operating in water and having upwardly opening centering jaws into which the apples are floated. Still another object of the invention is to provide in connection with a centering means arranged in water, a cage in which the apples are received before being delivered to the centering means, such cage acting to prevent the crowding of apples at the centering means, and means being provided for feeding the desired amount of apples to the cage. Still another object of the invention is to provide a means which will separate floating apples and feed them one at a time to a centering means. Another object of the invention is to provide in connection with the centering means which centers apples floating in a tank, a current producing means for directing the apples toward the centering means, and means which will feed the floating apples one at a time to the centering means.

To these and other ends, the invention consists of certain parts and combinations of parts, all of which will be hereinafter described, the novel features being pointed out in the appended claims.

In the drawings:

Fig. 2 is a top view of a portion of an apple floating tank with which a number of paring machines are associated;

Fig. 3 is a vertical section through the tank;

Fig. 4 is a detail view of the apple receiving cage in the tank;

Fig. 5 is a fragmentary view showing one of the lifters and the apple receiving cage;

Fig. 6 is a fragmentary detail view of the cage and one of the lifters, showing the lifter in its lowermost position;

Fig. 7 is a fragmentary view partially in section showing one of the lifters in position to deposit an apple in the cage;

Fig. 8 is a plan view of the centering means;

Fig. 9 shows the centering means in side elevation with parts in vertical section, the full lines showing the centering means in its centering position and the dotted lines showing the centering means open to receive the fruit;

Fig. 10 is a fragmentary view showing the manner of operating the centering means;

Fig. 11 is a fragmentary view showing the means for operating the mechanism for transferring the apples from the centering means to the supporting forks of the paring machine;

Fig. 12 is a view at right angles to that shown in Fig. 11 with the parts illustrated in Fig. 11;

Fig. 13 is an enlarged view of the indexing means of the transferring mechanism;

Fig. 14 is a fragmentary view showing the transferring mechanism associated with the centering means in the tank;

Fig. 15 is a view at right angles to that shown in Fig. 14 of some of the parts illustrated in Fig. 14;

Fig. 16 is a fragmentary view of the guide and one of the movable forks of the transfer mechanism;

Fig. 17 illustrates a cushion at the lower end of the slide which moves the forks on the transfer mechanism;

Fig. 18 is a fragmentary plan view of the centering means and parts associated therewith;

Fig. 19 is a fragmentary view partially in section of the pusher which shifts the article holding device or fork on the transfer mechanism, to present the same to the holding or supporting fork on which the article is pared;

Figure 1:
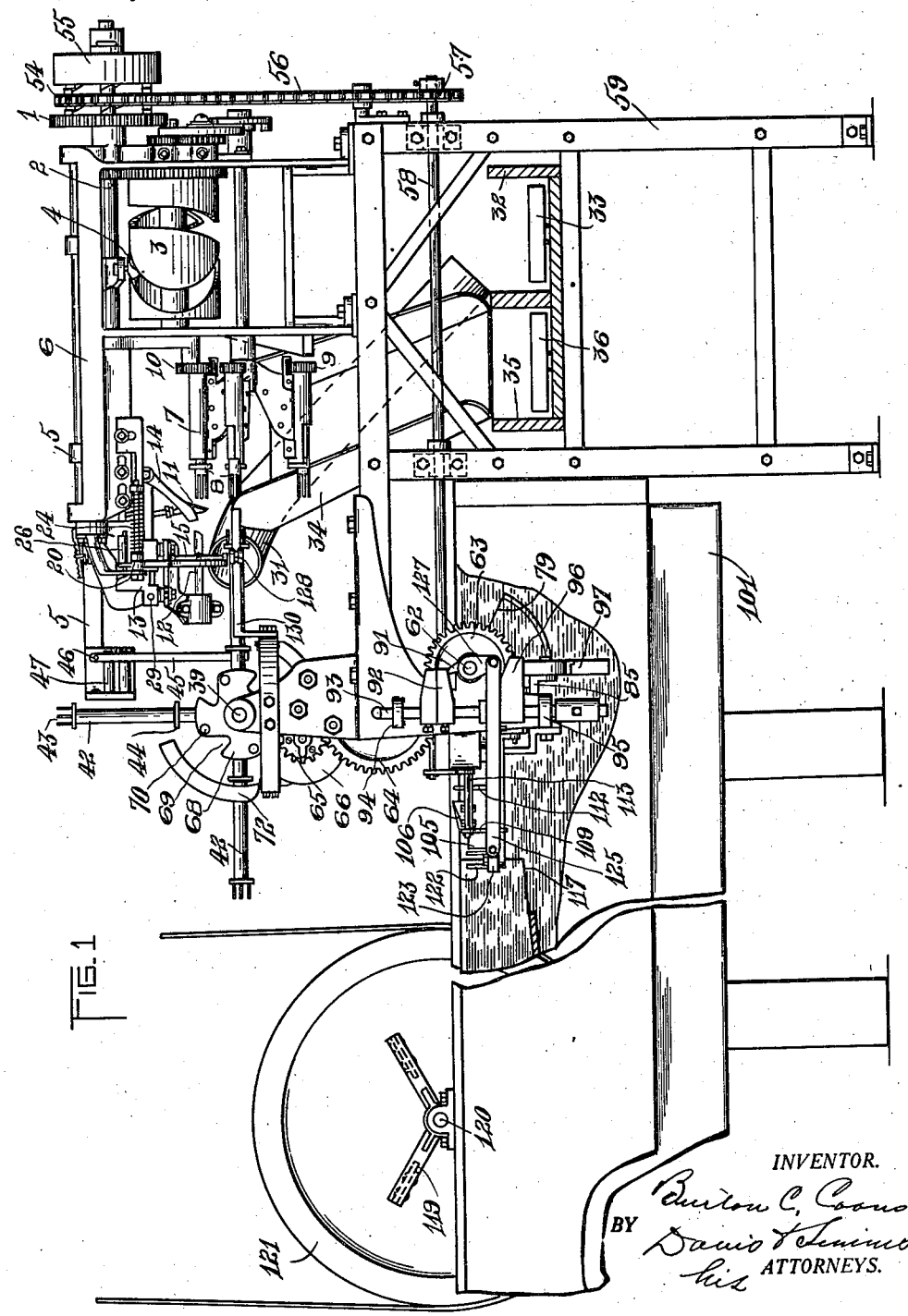
Fig. 1 is a side view of a paring machine constructed in accordance with the present invention, parts being shown broken away and other parts being shown in section.

Fig. 19$^a$ is a detail view showing the manner in which the apples are stripped from the supporting device which feeds the apples to the fork of the paring machine;

Fig. 19$^b$ is a detail view of the stripping means;

Fig. 20 is a fragmentary view of the pusher mechanism showing the connection between the pusher and the sliding fork on the rotary transfer carrier;

Fig. 21 is a detail view of a portion of the driving mechanism;

Fig. 22 is a fragmentary view showing the arrangement of the dividing mechanism;

Fig. 23 is a detail view of the dividing mechanism at right angles to that shown in Fig. 22;

Fig. 24 is a detail view of the central portion of the dividing mechanism;

Fig. 25 is a sectional view of the central portion of the dividing mechanism showing the cooperating of the coring knife or spoon with the dividing means;

Fig. 26 is a diagrammatic view of the operation of the conveyors which conduct the divided articles and parings in opposite directions; and Fig. 27 is a fragmentary sectional view of one of the conveyors.

In the illustrated embodiment of this invention there has been combined with substantially the mechanism illustrated in my U. S. Patent No. 1,168,788, dated January 18, 1916, a mechanism for quartering the articles and also a mechanism for feeding the articles to the apple supporting forks on which the fruit is pared. It is understood however, that the invention is not limited to the machine illustrated in my aforesaid patent. I do not describe and illustrate in detail all the parts of the mechanism illustrated in my aforesaid patent, but should the operation of the mechanism not be clear, reference to the aforesaid patent may be had.

The mechanism in my previous patent generally comprises a drive gear 1 which connects with a gear 2 to a cam drum 3 in which a follower 4 operates, this follower being connected with a reciprocating carriage 5 operable upon the frame 6. Also mounted on the frame 6 is a rotary reel 7 carrying three article supporting devices in the form of rotary forks 8 which have pinions 9 on their shafts adapted to be brought successively intermeshed with the pinion 10 whereby said forks are rotated when they are in position to be operated upon by the paring knife 11. The paring knife is swung in an arc through the medium of the carriage 5 for the purpose of paring the apple during its rotation by the fork 8 adjacent said knife. After the paring takes place, a coring knife or spoon 12, which is mounted on a frame 13 connected to the carriage 5 is moved into the pared article and cuts the core therefrom after which the carriage 5 moves in the opposite direction and through the pivoted pusher 14, the pared and cored apple is removed from the fork 8. Immediately thereafter, another fork 8 with an apple thereon is presented to the paring mechanism. For the detailed operation of any and all of these parts reference may be had to my aforesaid Patent #1,168,788.

One of the features of this invention is a dividing or quartering mechanism, this dividing mechanism comprising in this instance, four radially arranged slicing blades 15, three of which are secured at their inner ends to a center piece 16 and all of which are held separated at their outer ends by ring segments 17, the inner end of the other blade being spaced from the center piece at 18. These ring segments 17 form a supporting frame for the blades and one of the segments is provided with an arm 19 formed with a sleeve 20 which is guided on a rod 21 for movement of the quartering device in the direction of the line of the fork at paring position. The rod 21 is supported by a bracket arm 22 which is bolted at 23 to the frame 6 and a spring 24 surrounds the rod 21 and holds the quartering frame 19 in its outer position. Arranged on the bracket arm 22 is a rod 25 which is parallel with the rod 21 and has an eccentrically arranged sleeve 26 mounted to turn thereon, said sleeve being held in its adjusted position by a set screw 27 and cooperating with an arm 28 formed on the quartering frame. This eccentric sleeve 26 when turned upon the rod 25, will cause the blades 15 to be shifted so that the center portion 16 may be caused to align with the fork at paring position. The bolt connection 23 between the bracket arm 22 and the frame 6 is so formed that the bracket arm may also be shifted slightly and in this way a further adjustment is provided for permitting the alignment of the center portion 16 of the quartering device to be aligned with the fruit in paring position.

In the operation of the dividing or quartering mechanism in connection with the paring machine, the fruit on the fork 8 at paring position is first pared by the paring knife 11 after which the coring spoon or knife, which surrounds the center portion 16 in the space 18, is moved longitudinally in said space, due to the fact that the carriage 13 on which the coring spoon or knife 12 is supported is moved on the frame 6. In moving, the projection 29 on the frame 13 engages with the projection 30 on the quartering frame and causes said quartering frame to shift on the rod 21, this shifting being for the purpose of permitting the coring knife 12 to complete its inward or coring movement without interference by the quartering mechanism. Of course, the quartering knife is not moved far enough to engage the fruit on the fork 8 in paring position. As the coring knife 12 moves away from the fork 8 at paring position, the quartering device recedes and at the same time the apple is pushed off the fork 8 by the pusher 14 and is carried by said pusher and the coring knife or spoon 12 toward the quartering mechanism, the pusher forcing the pared and cored fruit against the four knives causing the quartering of the fruit. It will be noted that the lowermost of these knives is advanced with reference to the other knives, the purpose of this being to insure the severing of the fruit by the lower knife, due to the fact that the pusher has a tendency to move the upper portion of the fruit in advance of the lower portion.

The quartered fruit is discharged into a chute 31 which directs the quarters into a trough 32 in which operates a conveyor 33, the trough and conveyor being common to a plurality of paring machines. The parings are dropped upon a chute 34 which directs them to a trough 35 in which an endless conveyor 36 operates like the conveyor 33. The upper lap of each of these conveyors operates in the trough and the lower lap operates below the trough. The conveyor 33 has its upper lap moving in one direction to discharge at 37 while the upper lap of the conveyor 36 operates in the other direction to discharge at 38 at the opposite end of the machine, this being clearly shown in Fig. 26.

For the purpose of feeding the forks 8 with the fruit while said forks are away from paring position, there is provided a feeding mechanism. This mechanism includes a fork feeding means comprising in this instance a transfer carrier mounted to turn about a horizontal axis 39 and having a plurality of radially arranged arms 40, four in this instance, each of these arms being adapted to be brought into alignment with that paring fork 8 which is next to be presented to the paring position. Each arm has mounted thereon, a fruit holding device, such device in this instance, consisting of a sleeve 42 formed at one end with a fork 43 and having also a surrounding flange or collar 44. The fruit holding device after being positioned in alignment with the fork on the paring machine is moved axially of the arm 40 so that the fruit on the fork 43 of the rotary carrier will be carried to the fork 8 of the paring machine.

The movement of the fruit holding device 42 on the arm 40 is preferably effected by a yieldingly mounted device 45, (see Figs. 19 and 20) preferably in the form of an arm pivotally mounted at 46 on the reciprocatory frame 5 of the paring machine, this arm yielding to accommodate apples of different sizes. Movement of this arm in one direction is resisted by two rubber cushions 47 which surround bolts 48, while stop pins 41 serve to limit the movement of the arm 45 in the opposite direction. This arm 45 carries an abutment 49 which is adapted to cooperate with the collar 44 on the holding device 42 in order to move the holding device toward the fork 8 of the paring machine, this occuring as the reciprocatory carriage 5 moves inwardly to force the coring knife into the fruit at paring position. Arranged on the arm 45 is also a detent 50 pivoted at 51 on a laterally projecting arm 52 on the arm 45, this detent being pressed outwardly by a spring 53. When the reciprocatory carriage 5 moves outwardly to withdraw the core from the fruit at paring position, this detent 50 will engage with the collar 44 and move the fruit holding device 43 away from the fork on which said fruit holding device has impaled the fruit. The teeth of the forks 43 are shorter than the teeth on the forks 8 which have greater holding power than the forks 43.

In order to insure the removal of the fruit from the forks 43, there is provided a stripping means, (see Figs. 19$^a$ and 19$^b$). This stripping means comprises an arm 130 supported horizontally to one side of the plane of rotation of the rotary transfer carrier and having a detent or stripping element 131 pivoted thereto at 128, a spring 129 acting on said detent to hold it in the path of an apple on the fork 43 as such fork moves to carry the apple to the fork 8. When the fork 43 moves away from the fork 8, the detent 131 will engage the apple and strip the apple from the fork 43 so that the apple remains upon the fork 8.

The rotation of the rotary carrier may be effected in any suitable manner. In this instance, the shaft 39 is turned in timed relation to the paring mechanism and to this end a sprocket wheel 54 is mounted at one side of the gear 1 and is adapted to be driven through a pulley 55 which has a clutch connection with the sprocket wheel, the sprocket wheel being connected to the gear 1 so as to drive the latter from the pulley 55. A sprocket chain 56 passes about the sprocket wheel 54 and also about a sprocket wheel 57 on a shaft 58, the latter being mounted on a frame 59 which also supports the frame 9 and the troughs 32 and 35. The shaft 58 has at its opposite end a worm 60, the latter meshing with a worm wheel 61 on a shaft 62. This shaft 62 carries a gear 63 which meshes with a larger gear 64 in turn meshing with a pinion 65 turning with a notched disk 66. This notched disk has a cylindrical periphery except for the notched portion 67, and such disk cooperates with an indexing wheel 68 formed with four notches 69 in its periphery and four lateral projections 70 to one side of the notches. A pin or projection 71 extends laterally from the notched disk 66 and is adapted to enter into engagement with the walls of the notches 69 in the indexing wheel or disk 68 in order to turn said wheel and transmit motion to the shaft 39 to which the indexing wheel 68 is secured. The projections 70 on the indexing wheel cooperate with the periphery of the notched disk 66 and hold the indexing wheel against turning except when one of the projections 70 reaches a notch 67, this occurring at the same time that the projection 77 enters into engagement with one wall of one of the notches 69. It is apparent that each time the projection 71 engages a wall of one of the notches 69, the rotary carrier will be turned one step.

The fruit is presented beneath the rotary carrier in a manner to be hereinafter described, the stem end of the fruit being arranged uppermost. In order that each fork on the rotary carrier may be presented to the fruit supported below the carrier each arm 40 of the carrier, after presenting the fruit to a fork 8, moves upwardly and then turns so that the collar 44 thereon engages with the uppermost end of a curved guideway 72 which holds the sleeve 42 in its innermost position on the arm 40 until a notch 73, see Fig. 16, is reached when the arm 40 will be vertically arranged and depending from the axis 39 of the carrier. As the collar 44 reaches the notch 73 the sleeve 42 is freed and drops by gravity on the arm 40 to impale the fruit which is positioned directly below said arm. After this impaling and before the carrier turns, the sleeve 42 is elevated so that upon the turning of the carrier, the collar 44 will enter into engagement with the curved guide 72 and retain the sleeve 43 in its innermost position on the arm 40 until the arm has reached a horizontal position in alignment with one of the forks 8.

The elevation of the sleeve 42 with the apple impaled on the fork 43 thereof may be effected in any suitable manner. In this instance, there is provided a slide 74 guided at 75 and 76 for a vertical movement and having an arm 77 formed with a notch 78 at its free end in which there is received the collar 44 on each of the sleeves 42, the collar entering the notch as it reaches the position opposite the notch 73 in the guide 72. The control of this slide 74 is effected preferably through a cam 79 arranged on the shaft 62 and having two cam surfaces 80 thereon, each of which has two portions, both of which cooperate with an abutment 81 on the slide 74 to first elevate the slide and then to hold the slide in its elevated position against movement, spaces being provided between the two portions of the cam which permit the slide to drop under its own weight so that the slide and the sleeve 42 may fall together for the purpose of impaling the fruit. The lower end of the slide may cooperate with a cushion 82, see Fig. 17, for the purpose of absorbing the shock due to the fall of the slide and the sleeve 42 when there is no apple in the cup. It is apparent that the cam 79 operates in timed relation to the turning of the rotary carrier so that the sleeves 42 fall and are elevated when the collars 44 are opposite the notch 73 in the guide 72. The rotary carrier preferably takes the fruit from a centering mechanism arranged directly below the carrier. This centering mechanism in this instance consists of a frame 83 secured by bolts 84 to a horizontal bar 85 which is rigidly supported on the main frame. The bolts which secure the frame 83 to the bar 85 are so connected to the bar 85 that the frame 83 may be shifted on the bar 85 so that the centering means may be properly centered with reference to the rotary carrier, this result being preferably secured by making the bolt openings in the frame 83 of materially larger diameter than the bolts so that the frame may shift laterally on the bar. The frame 85 has a flat horizontally presented surface 86 on which the fruit is brought to rest by the centering jaws, so that the apple may have a flat surface to lie against during the impaling of the apple. This surface has a central opening 86ª through which a stem may project if the blossom end is floating upward. The centering of the apple may be effected by two jaws 87, each of which has a concave face opposed to a similar face on the other jaw so that the fruit may be received between the two concave faces of the jaws. Each jaw is preferably pivotally mounted to turn about a horizontal axis 88 located in this instance below the surface 86 of the frame, the jaws having arms 89 near opposite ends connecting with the shafts 88 on opposite sides of the surface 86. It is preferred to connect the two jaws so that they operate simultaneously toward or away from each other, this being effected preferably through intermeshing gears 90. The jaws not only have their opposed faces concave, but these faces also converge in an upward direction when the jaws are in their innermost positions, the purpose of this being to permit the fruit from slipping from the jaws on the closing of the latter. The opening of the jaws takes place after the fruit is impaled and before the impaling means starts to rise, and may be effected by two cams 91 arranged on the shaft 62 and cooperating with an arm 92 on a weighted slide 93 which is guided at 94 and 95 on the frame of the machine. This slide 93 also has an arm 96 cooperating with one end of a lever 97 which is pivoted at 98 to the bar 85. The other arm of this lever 97 cooperates with a weighted roller 99 arranged at the free end of an arm 100 projecting from one of the arms 89 of one of the centering jaws 87. Shortly before one of the forks of the rotary carrier has removed the fruit from the centering jaws, these jaws open, due to the fact that the lever 97 engages the weighted roller 99 and moves the jaws to open position.

After the fruit has been floated in the jaws and shortly prior to the dropping of a sleeve 42 with its fork 43, the jaws close, this being effected through the release of the weighted roller 99 by the lever 97. Of course, the jaws will close to different degrees depending upon the diameter of the fuit held by them and as both jaws move simultaneously, the fruit will be centered on the supporting surface 86 with reference to the fork on the slide sleeve 42.

The centering device is preferably arranged within a tank 101 containing water, the water being held in this tank at a level which will permit the fruit to float between the jaws 87 and to be gripped by said jaws while in its floating condition. To facilitate the entrance of the fruit between the jaws, these jaws are each provided with a deflecting portion 102, the deflected portion on the jaws being arranged at one side of the frame 83 and diverging with reference to each other so as to direct the floating fruit between the jaws. At opposite sides of the jaws, the latter are connected by a flexible device 103 which permits the jaws to approach each other closely, but at the same time, when the jaws are separated, this device will prevent the floating fruit from passing from this side of the jaws.

With the end in view of preventing the crowding of the fruit about the entrance to the jaws, there is provided at the jaw entrance, a cage of a size to receive one fruit only, this cage opening at its side toward the jaws and having its bottom wall provided with openings and its wall removed from the jaws formed by a number of upwardly extending fingers 104, the other sides 105 of said cage being closed and acting to guide the fruit toward the centering jaws. In order to feed the cage with fruit one at a time, a feeding means is provided which comprises two lifters or separators, one on each side of the cage. These lifters are preferably in the form of arms 106 pivoted at 107 and having notches 108 at their free ends in which the fruit is adapted to be received for the purpose of retaining said fruit during the swinging of the arms, these arms moving alternately to deposit the fruit in the cage. It is preferred to provide each arm with depending fingers 109 which act as guards to prevent the fruit passing beneath the lifting fingers. It is also preferred to provide each arm with a bevelled surface 110 in rear of the notch 108 so as to prevent more than one fruit resting on the arm at one time when the lifters are in their uppermost positions.

On that side of each arm adjacent the centering device and preferably projecting laterally from opposite sides of the cage are frames 111 carrying guard fingers 112. These guard fingers prevent the fruit from floating beyond the lifting devices and cause any fruit that engages with the guard fingers to come to rest in the water above the lifting devices. The lifting devices, after the fruit has been brought to rest by the guard fingers 112 rise under the fruit and elevate such fruit to cause it to roll off the lifting devices over the side walls 105 of the cage into such cage for it will be noted that when the lifting devices are in their uppermost positions (see Fig. 7) the upper surface of each lifting device will be on an incline with reference to the level of the water so that the fruit will roll off said fingers into the cage where it will again float with its core upright. The alternate movements of the lifting devices may be effected in any suitable manner. In this instance, each lifting device has an arm 113 extended laterally therefrom and cooperating with a cam 114 (see Figs. 5 and 18) the cams 114 being arranged on the shaft 62 in such a manner that the lifting devices 106 are alternately raised.

The apples or fruit are dumped into a tank 101 and the one end of the apples will float uppermost so that their cores are brought with their axes upright. In this tank are a number of partitions 115 arranged in pairs, each pair being separated from the adjacent pair or the side walls of the tank to provide spaces 116. These partitions do not extend to the centering jaws, but have at their ends adjacent the centering jaws, deflectors 117 converging toward and ending adjacent the lifters 106. Within the channels 118 between the members of a pair of partitions, paddle wheels 119 operate, these wheels being arranged upon a shaft 120 driven by a pulley 121. These paddle wheels create a current toward the centering means and through the channels 118 so that there is a tendency for apples in said channels 118 to float toward the centering means. The spaces 116 about the channels 118 permit the return flow of the water.

With the end in view of preventing the crowding of the fruit about the lifting devices, agitating means is provided adjacent the lifting device. This agitating means in this instance consists of two fingers 122, see Figs. 2 and 18, mounted on a lever 123 which is pivoted at 124 between two fingers and is extended laterally to connect with a pitman 125, the latter being pivotally connected at 126 with a crank arm 127 mounted on the shaft 62, the turning of the crank arm vibrating the lever 123 and causing the fingers to agitate the fruit adjacent the lifting devices.

The apples are dumped into the channels 118 in advance of the current producing paddles 119 which rotate in a direction to cause the apples to float toward the lifting devices 106. The crowding of the apples adjacent the lifting devices is prevented by the agitators 122 and the apples pass to the lifting devices gradually, the fingers 109 preventing the apples passing under the lifting devices while the fingers 112 prevent the apples passing beyond the lifting devices. If two apples float above any one of the lifting devices, the apple nearest the pivot 107 of the lifting devices will be deflected by the bevelled portion 110 while the other apple will be elevated and deposited into the cage 105. In this cage the current still affects the apples and directs them into the jaws of the centering device where it floats with one end upright. While in this floating condition, the jaws close upon the apple and center the same notwithstanding its size, so that its core is aligned with the fork 43 when the latter descends under the action of gravity. Later, the jaws open and the fork is raised, carrying the apple above the water. The transfer carrier then turns and presents the fork slide 42 in alignment with that fork 8 which is next to be moved to paring position. The slide 42 is now moved axially so that the fruit on the fork 43 is impaled upon the said fork 8, this axial movement of the slide being effected through the yielding pusher 45 which through the latch 50 returns the slide 42 to the original position. As the slide 42 is returned, the fruit is stripped from the fork 43 by the fork 8 and this is insured by the stripping means. After the slide 42 returns to its original position on the rod or arm 40, the rotary carrier turns one step to swing said arm upwardly. Later this slide enters into engagement with the track 72 which holds the slide against movement until the notch 73 in the track or guide 72 is reached. After an apple is pared by the paring mechanism it is subjected to the dividing or quartering mechanism, this being accomplished through the pusher 14 which travels with the coring spoon 12 and forces the apple into engagement with the quartering knives. The quartered apples drop into the chute 31 where they are directed to the trough 32 and later being cleared from the trough by the conveyor 33. The parings and cores drop into the chute 43 which conducts them to the trough 35 from which they are removed by the conveyor 36.

What I claim as my invention and desire to secure by Letters Patent is:

1. A paring machine comprising a device on which the article is supported during the paring, a paring knife cooperating with the article on the supporting device, a dividing device having radially arranged relatively fixed blades, a coring device arranged to pass through said dividing device to core the article on the supporting device, and a push off device cooperating with said coring device to transfer the article from the supporting device to the dividing device.

2. A paring machine comprising a supporting device on which the article is supported during paring, a paring knife for cooperating with the article on the supporting device, a plurality of blades arranged in spaced relation to the supporting device, a coring device movable toward the supporting device to core an article on said supporting device, a push off cooperating with said coring device to remove an article from the supporting device and transfer the same to the blades to cause such article to be divided by said blades.

3. A paring machine comprising a device for supporting an article during the paring thereof, a knife for paring an article on said supporting device, a plurality of radially arranged dividing blades, a coring device operating substantially in line with the center formed by said blades, to move toward and from the supporting device, and a push off cooperating with said coring device to transfer an article from said supporting device to the radially arranged blades to divide the pared article.

4. A paring machine comprising a supporting device on which the articles are supported during paring, a paring knife for operating upon an article on a supporting device, a dividing device movable in the direction of the length of the supporting device, a coring device movable in the direction of the length of the supporting device and engaging with said dividing device so that the latter may move toward the supporting device in order not to interfere with the movement of the coring device, and a push off arranged to cooperate with the coring device to transfer a pared article from the supporting device to the dividing device.

5. A paring machine comprising a supporting device on which the article to be pared is supported during paring, a paring knife for paring the articles on the supporting device, a feeding carrier for feeding the articles to the supporting device having a straight line guide adapted to be aligned with the supporting device, and a supporting device mounted on said carrier and movable on said guide relatively to the carrier to carry an article from the second named supporting device to the first named supporting device.

6. A paring machine comprising a supporting device on which an article is supported during the paring thereof, a paring knife for cooperating with an article on said supporting device, a rotary carrier having a plurality of guides thereon adapted to be successively aligned with the supporting device, and supporting devices, each mounted on the carrier and movable on one of said guides relatively to the carrier when the guide aligns with the first named supporting device for the purpose of feeding an article from the second named supporting device to the first named supporting device.

7. A paring machine comprising a supporting device by which an article is supported during the paring thereof, a paring knife for cooperation with an article on said supporting device, a movable carrier having a plurality of guides thereon adapted to be successively brought into alignment with said supporting device, supporting devices movable upon said guides relatively to the carrier to carry an article to the first named supporting device, and mechanism for stripping the articles from the second named supporting device as the latter move away from the first named supporting device.

8. A paring machine comprising a paring mechanism, a reciprocatory carriage through which said mechanism is operated, a plurality of supporting devices movable successively into cooperation with the paring mechanism in order that articles on said supporting devices may be pared by said paring mechanism and a plurality of supporting devices for successively feeding apples to the first named supporting device, said second named supporting devices being successively brought into connection with the reciprocatory carriage so that said carriage moves the said second named supporting devices to present the articles to the first named supporting device.

9. A paring machine comprising a paring mechanism, a reciprocatory carriage through which said mechanism is operated, a plurality of supporting devices adapted to be successively presented to the paring mechanism, a second supporting device for presenting an article to the first named supporting device, and a yielding connection between the reciprocatory carriage and the second named supporting devices for moving said second named supporting devices to present an article to the first named supporting device.

10. A paring machine comprising a paring mechanism, a reciprocatory carriage through which said mechanism is operated, a plurality of supporting devices presented successively to said paring mechanism so that the latter may pare articles upon said supporting devices, a second named supporting device, a movable carrier on which said second named supporting device is adapted to move in order to present an article to the supporting devices first named, and a yieldingly mounted member on said carriage with which said second named supporting device is adapted to be brought into connection for the purpose of imparting the movement of the reciprocatory carriage to the second named supporting device.

11. A paring machine comprising a paring mechanism, a reciprocatory carriage through which said paring mechanism is operated, a plurality of supporting devices adapted to be brought successively into cooperation with said paring mechanism, a rotary carrier, supporting devices movably mounted on said carrier, and means on the recipocatory carriage for connecting with said supporting devices on the rotary carrier for the purpose of moving said supporting devices in order to present an article to the supporting devices first mentioned.

12. A paring machine comprising a paring mechanism, a reciprocatory carriage through which said paring mechanism is operated, a rotary reel having a plurality of supporting devices adapted to be brought successively in to cooperation with the paring mechanism, a rotary carrier, a plurality of supporting devices, movable on the carrier and adapted to be brought successively into cooperation with the supporting devices on the reel, and a connection between the reciprocatory carriage and the supporting devices on the rotary carrier for moving said supporting devices to present articles to the supporting devices on the rotary reel.

13. A paring machine comprising a paring mechanism, a reciprocatory carriage through which said mechanism is operated, a rotary reel having a plurality of supporting devices thereon adapted to be brought successively into cooperation with the paring mechanism, another set of supporting devices adapted to be brought successively into cooperation with the supporting devices on the rotary reel, and means carried by said reciprocatory carriage and with which the second named supporting devices are adapted to be brought into cooperation for the purpose of moving said second named supporting devices to present articles to the first named supporting devices.

14. A paring machine comprising a paring mechanism, a reciprocatory carriage through which said paring mechanism is operated, a rotary reel having a plurality of supporting devices thereon and adapted for successive cooperation with the paring mechanism, a yieldingly mounted member on said reciprocatory carriage, and a second set of supporting devices adapted to be brought successively into cooperation with the yieldingly mounted member on the reciprocatory carriage for the purpose of causing said second named supporting devices to be moved to present articles to the first named supporting devices.

15. A paring machine comprising a paring mechanism, a reciprocatory carriage through which the paring mechanism is operated, a rotary reel, a plurality of supporting devices carried by said reel and adapted to be brought successively into operation with the paring mechanism, an arm pivoted to and depending from said carriage, yielding means for resisting the movement of the arm, a rotary carrier, and a plurality of supporting devices mounted on said carrier and adapted to be brought successively into cooperation with the depending arm in order that said arm may move said supporting devices on the carrier to present an article to the supporting devices of the reel.

16. A paring machine comprising a paring mechanism, a supporting device on which the article is held during the paring, a rotary carrier provided with a plurality of arms adapted to be successively brought into alignment with said supporting device, sleeves movable on said arms and having fruit penetrating forks on which an article is adapted to be supported, and means for moving said sleeves on the arms to present articles on the forks to the supporting devices on which the paring takes place.

17. A paring machine comprising a paring mechanism, a supporting device on which the article is held during the paring thereof, a plurality of axially movable fruit penetrating forks, and a carrier arranged to carry said forks so that their line of movement is alined with the longitudinal axis of the supporting device.

18. A paring machine comprising a paring mechanism, a device on which the article to be pared is supported during the paring operation, an article centering means mounted in a fixed position, having movable centering jaws, and a fruit penetrating fork for removing the article from the centering means and transferring it to the supporting device on which the article is to be pared.

19. A paring machine comprising a paring mechanism, a device on which the article is supported during the paring operation, an article centering means, mounted in a fixed position and having movable centering jaws for the article, a guide mounted to swing from said centering means to the supporting device, and a fruit penetrating device movable on said guide to engage and remove an article from the centering means and to present an article to the first named supporting means.

20. A paring machine comprising a paring mechanism, a supporting device on which an article is supported during the paring thereof, an article centering means, mounted in a fixed position and having movable centering jaws, a rotary carrier, and fruit penetrating forks movable axially on the carrier and adapted to be presented successively to the centering means and then to and in alinement with the supporting device on which the paring takes place.

21. A paring machine comprising a paring mechanism, a device on which the article is supported during the paring operation, an article centering means, mounted in a fixed position and having movable centering jaws and means for transferring the centered article from the centering means to the supporting device on which the paring takes place.

22. A paring machine comprising a paring mechanism, a supporting device for supporting an article during the paring operation, an article centering means mounted in a fixed position and having movable centering jaws and a rotary carrier having a plurality of guide rods and sleeves movable on the rods, and carrying forks, said forks being adapted to be presented successively to the supporting device on which the article is pared.

23. A paring machine comprising a paring mechanism, a supporting device on on which the article is pared, an article centering means, mounted in a fixed position and having movable centering jaws, and means for transferring the articles from the centering means to the supporting device comprising a rotary carrier, supporting devices movably mounted on said carrier mechanism for effecting the movement of the supporting devices on the carrier toward and from the centering means, and mechanism for effecting the movement of said carrier supporting devices toward and from the first named supporting device.

24. A paring machine comprising a paring mechanism, a supporting device on which an article is held during the paring operation, an article centering means, mounted in a fixed position and having movable centering jaws, a rotary carrier, a plurality of supporting devices movably mounted on the carrier, and a track by which said supporting devices are held against movement during the turning of the carrier, said track being formed to permit the movement of the supporting devices toward and from the centering means and toward and from the supporting means first mentioned.

25. A paring machine comprising a paring mechanism, a horizontally arranged fork on which the paring operation takes place, a carrier mounted to rotate about a horizontal axis, a plurality of radially movable supporting devices arranged on said carrier and adapted to be brought successively in horizontal alignment with the fork on which the articles are pared, a centering means arranged in a fixed position vertically below the shaft of the rotary carrier and having movable centering jaws, means for effecting the movement of the supporting devices on the carrier to cause said supporting devices to engage and remove an article from the centering means, and means for effecting the movement of the supporting devices on the carrier to cause said supporting devices to present the articles thereon to the horizontally arranged fork.

26. The combination of a carrier rotatable about a horizontal axis and having a plurality of article supporting devices movably arranged thereon, an article centering means arranged in a fixed position vertically below the axis of the carrier and having movable centering jaws, and means for effecting the movement of the supporting devices on the rotary carrier to permit the supporting devices to engage an article held by the centering means to remove such article from the centering means.

27. The combination of a rotary carrier mounted to turn about a horizontal axis, a centering means arranged vertically below the axis of the carrier, a plurality of article supporting devices movable on said carrier, a track way for holding said article supporting devices against movement on the carrier during the turning of the carrier, said track way being provided with a portion which will permit the dropping of the supporting devices into engagement with an article in the centering means, as said supporting devices successively come to rest above said centering means, and means for elevating said supporting devices into connection with the track way after they have descended into cooperation with the centering means.

28. The combination of a rotary carrier having a plurality of radially extending guide arms, sleeves mounted to move longitudinally on said guide arms and provided with surrounding collars and with forks for engaging and holding an article, a centering means arranged vertically below the axis of the carrier, a track way with which said collars engage during the rotation of the carrier to hold said sleeves against movement, said track way being provided with a notch above the centering means through which a collar may pass to permit the sleeve to drop by gravity in order that the fork may impinge an article in the centering means, a vertically movable slide with which said collars engage as they approach the notch, and a cam controlling the dropping and raising of the slide.

29. A paring machine comprising a paring mechanism, a water tank, an article centering device arranged in a fixed position in the tank and having movable centering jaws, and means for removing a centered article from said centering device and transferring it to a position where it may be pared by the paring mechanism.

30. A paring machine comprising a paring mechanism, a tank in which the articles to be pared are floated, movable centering jaws mounted in said tank to seize and hold an article floating in the tank, and means for removing a centered article from said jaws and presenting it to the paring mechanism.

31. A paring machine comprising a paring mechanism, a tank in which the articles to be pared are floated, movable centering jaws in the tank operating in timed relation to the paring mechanism, and means for removing said centered articles from the centering jaws and presenting them to the paring mechanism.

32. A mechanism for centering apples with their cores upright comprising a tank, and upwardly opening movable centering and seizing jaws into which the apples arranged in the tank are floated.

33. Means for centering apples with their cores upright comprising a tank, centering means operating in the tank and adapted to receive apples floating in the tank, a cage opening to said centering means to feed floating apples to said centering means, and means for feeding apples one at a time from the tank into said cage for delivery to the centering means.

34. Means for centering apples with their cores upright comprising a tank, centering means operating in the tank to receive an apple floating in the tank, a cage opening to said centering means to feed apples to the centering means and also to prevent the crowding of the centering means by floating apples in the tank, and means for delivering applies one at a time to said cage.

35. Means for centering apples with their cores upright comprising a centering means, a tank in which said centering means operates, means for creating a current in the tank toward said centering means, a cage arranged to receive and to float apples prior to their movement to the centering means, and means for delivering apples one at a time to said cage.

36. Means for centering apples with their cores upright comprising a tank, centering means operating in the tank, means for causing a current of water in the tank toward said centering means, a cage arranged in said tank to deliver floating apples to the centering means, and a lifter arranged to remove apples from the tank and deposit them in the cage.

37. The combination with a tank, a cage in the tank adapted to receive and to float apples, lifters arranged to direct an apple from the tank to the cage, and a centering device arranged to receive apples from the cage.

38. Means for centering apples with their cores upright comprising a water tank, centering jaws having gripping portions to engage a floating apple in the tank, said jaws being pivotally mounted below their gripping faces so that the jaws open upwardly in the tank.

39. Means for centering apples with their cores upright comprising a water tank and a pair of centering jaws having gripping portions to receive the floating apples and pivotally mounted below said gripping portions, each of said jaws having at one side a guide for directing the floating apples between the jaws.

40. Means for centering apples with their cores upright comprising a water tank, a pair of jaws provided with gripping portions to receive the floating apple and pivotally mounted below said gripping portions, each of said jaws having at one side a guide for directing the floating apples between the jaws, and a flexible connection between the jaws at their opposite sides preventing the passage of the apples between the jaws at such point while permitting the relative movement of the jaws.

41. Means for centering apples with their cores upright comprising a water tank, a pair of pivotally mounted jaws operable in the tank and having each at one side a guide portion by which the apples are floated between the jaws, a cage arranged adjacent the guide portions for preventing the crowding of apples about the jaws, and means for delivering apples from the tank into said cage.

42. A paring machine comprising a paring mechanism, a water tank, a pair of centering jaws arranged in the tank and having gripping portions for receiving a floating apple, said jaws being pivoted below said gripping portions, and means for engaging an apple held by said centering jaws and transferring said apple to a position where it may be operated upon by the paring mechanism.

43. A paring machine comprising a paring mechanism, a water tank, movable centering means arranged to receive apples floating in the tank, means for engaging an apple held by the centering means and transferring such apple to a position where it may be operated upon by the paring mechanism, and means for operating said centering means in timed relation to the transferring means so that the centering means releases the apple after the latter is engaged by the transferring means and before the transferring means starts to shift the apple away from the centering means.

44. A paring machine comprising a paring mechanism, a supporting device on which the apple is supported during the paring thereof, a water tank, centering means arranged in the tank to center apples floating in the tank, transfer means for engaging the apples in the centering means and transferring them to the supporting device on which the paring operation takes place, and means for operating the centering means in timed relation to the transfer means to cause the centering means to release the apple before the transfer means moves to carry such apple to the supporting device.

45. A paring machine comprising a paring mechanism, a supporting device on which the apple is supported during the paring thereof, a water tank, a pair of centering jaws arranged in the tank and having guiding means at one side through which apples are directed to a position between the jaws, and a transfer means engaging the apples held by the jaws and transferring the same to the supporting device on which the apple is held during the paring.

46. In combination with a water tank, a centering means for apples or the like floating in the tank, comprising a pair of pivoted jaws having gripping surfaces and pivoted to turn about different centers below said gripping surfaces, opening upwardly and having means at one side to guide a floating fruit between them, a connection between the jaws whereby they move together or away from each other simultaneously, and means for operating the jaws to close them on an apple received in the tank.

47. A centering means for apples or the like comprising a pair of pivoted jaws having gripping surfaces and pivoted to turn about different centers below said gripping surfaces, a connection between the jaws whereby they move together or away from each other simultaneously, and means for operating the jaws, said means comprising an arm having a weighted roller, and a pivoted lever cooperating with said weighted roller.

48. The combination of a water tank, a cage arranged in said tank to hold apples in a floating condition, means for lifting apples from the water in the tank about the cage and delivering them into the cage, and centering means receiving the apples from the cage.

49. The combination of a water tank, a centering means, a cage arranged in said tank to hold apples in a floating condition and to deliver them to the centering means, and means for lifting apples from the water in the tank about the cage and delivering them into the cage, said means comprising a lifting device pivotally mounted at one side of the cage.

50. The combination of a water tank, a centering means, a cage arranged in said tank to hold apples in a floating condition and to deliver them to the centering means, means for lifting apples from the water in the tank about the cage and delivering them into the cage, said means comprising a lifting device pivotally mounted at one side of the cage, means for creating a current in the tank toward the lifting device, a guard to prevent the apples floating beyond the lifting device, and guarding means depending from the lifting device to prevent apples passing beneath the lifting device.

51. The combination with a water tank, a centering means, a cage arranged in said tank to hold apples in a floating condition and to deliver them to the centering means, means for lifting apples from the water in the tank about the cage and delivering them into the cage, said means comprising a lifting device pivotally mounted at one side of the cage, means for creating a current in the tank toward the lifting device, a guard to prevent the apples floating beyond the lifting device, guarding means depending from the lifting device to prevent apples passing beneath the lifting device, said lifting device having a portion adjacent its free end adapted to support an apple, and a portion in rear of said supporting portion formed to discharge an apple at one side of the lifting device in the event that more than one apple collects on the lifting device.

52. Means for separating apples in a floating tank comprising a water tank, a lifting device arranged in the tank, means for creating a current in the tank toward said lifting device, and a guard arranged to permit the flow of water past the lifting device, but to prevent the passage of floating apples.

53. Means for separating floating apples comprising a water tank, a pivotally mounted lifting device in the tank, means for creating a current in the tank toward the lifting device, a guard arranged to permit the flow of the current, but to prevent the passage of floating apples past the lifting device, and guarding means on the lifting device to prevent the passage of apples beneath the lifting device.

54. Means for separating floating apples comprising a water tank, a lifting device in the tank, means for creating a current in the tank toward the lifting device, guarding means to permit the flow of water past the lifting device, but to prevent the passage of apples past such lifting device, and agitating means adjacent the lifting device for preventing the crowding of apples at the lifting device under the action of the current.

55. The combination of a water tank, a centering means arranged in the tank, a cage operated in front of the entrance to the centering means to hold floating apples, means for creating a current in the tank through said cage to cause the cage to feed apples to the centering means, and means for feeding apples to the cage.

56. The combination of a water tank, centering means operated therein, means for creating a current in the tank toward the centering means, and means for operating on the apples fed to the centering means by the current to cause them to enter the centering means one at a time.

57. The combination of a water tank, centering means operated therein, means for creating a current in the tank toward the centering means, a cage arranged at the entrance of the centering means to prevent the crowding of the apples at the said entrance, lifting devices operating alternately on opposite sides of the cage to deliver apples one at a time into said cage, and guarding means arranged to prevent the apples passing beyond such lifting means under the action of the current.

BURTON C. COONS.